C. A. HOSKINS & J. L. METIER.
TIRE SHIELD.
APPLICATION FILED FEB. 6, 1917.
1,245,232.
Patented Nov. 6, 1917.
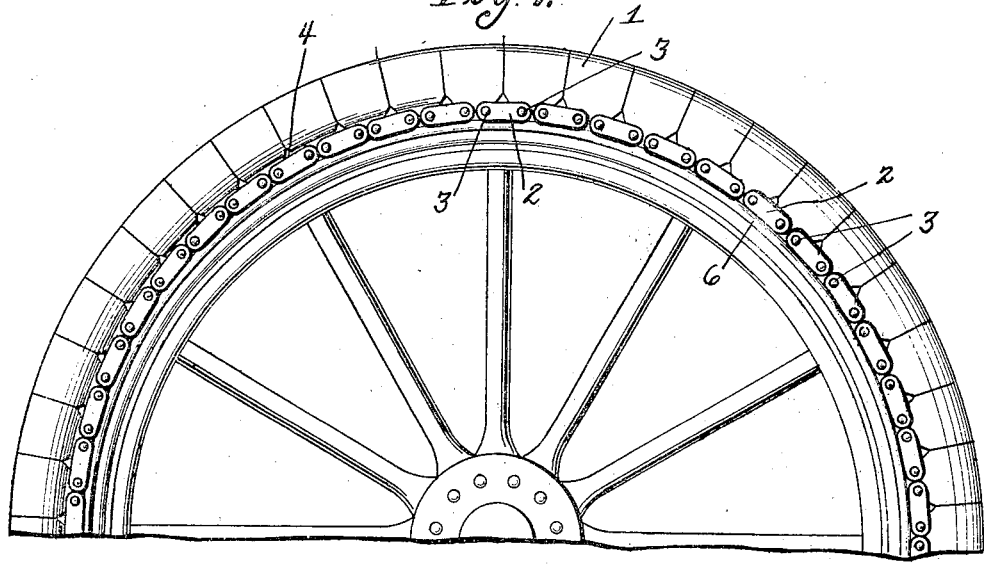
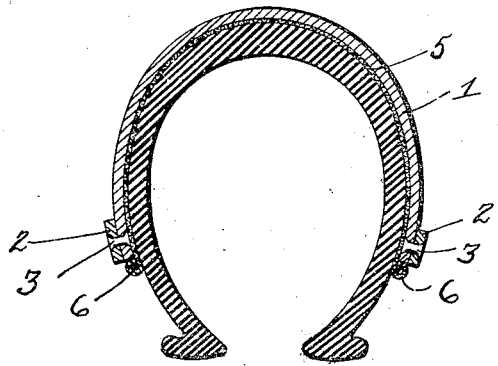
INVENTOR
Charles A. Hoskins
John L. Metier

UNITED STATES PATENT OFFICE.

CHARLES A. HOSKINS AND JOHN L. METIER, OF DRAKES CREEK, ARKANSAS.

TIRE-SHIELD.

1,245,232.　　　　　Specification of Letters Patent.　　　Patented Nov. 6, 1917.

Application filed February 6, 1917. Serial No. 146,951.

*To all whom it may concern:*

Be it known that we, CHARLES A. HOSKINS and JOHN L. METIER, citizens of the United States, residing at Drakes Creek, in the county of Madison and State of Arkansas, have invented certain new and useful Improvements in Tire-Shields, of which the following is a specification.

The present invention relates to shields for pneumatic tires, primarily designed to take up the wear off the tread of the tire to render the tire puncture proof, thus increasing the life of the tire.

The invention resides in a flexible metallic shield composed of a plurality of arcuate sections arranged side by side and pivotally linked together at their adjacent ends to form an annular member provided with an internal annular channel, and in a covering or lining of cotton fabric or other suitable material between the shield and the tire. This covering or lining acts as a cushion between the surface of the tire and the shield, prevents sand or other particles from lodging or otherwise getting between the shield and the face of the tire and prevents wear on the surface of the tire which would be caused by the frictional contact of the shield therewith.

Other features of the invention resides in the novel construction and arrangement of parts which will be hereinafter described more in detail and finally pointed out in the appended claim.

In the drawings:—

Figure 1 is a fragmentary side elevation of a wheel showing the shield constructed in accordance with the invention applied to a tire on the periphery of the wheel, and Fig. 2 is a transverse sectional view through the pneumatic tire with the invention applied thereto so as to bring out the specific details of the present invention.

Like characters denote similar and like parts throughout the specification and drawings.

Referring particularly to the drawings, the shield is composed of a plurality of substantially rectangular metallic plates or strips 1 having their corners cut away on a diagonal line as shown at 4. These plates 1 are bent substantially semi-circular and are arranged side by side and connected together at their adjacent ends by links 2 secured by rivets or other suitable fastening means 3, so as to provide an annular shield with a tire receiving channel on their inner periphery. The plates for sections 1 are to be approximately two inches in width and each shield is of such a diameter that the contiguous edges of the adjacent sections 1 will always be in close juxta-relation so as to prevent any object from projecting between the contiguous edges of the sections and puncture the tire. It will also be noted that the ends of the links 2 are each independently secured to the sections 1 so as to avoid unnecessary protrudings at the sides of the shield as would occur if the ends of each link 2 overlapped the other.

A suitable lining 5 is provided between the shield and the outer surface of the tire. This lining extends around the circumference of the tire and substantially envelops the same so as to take up the wear that would be caused on the surface of the tire by frictional contact with the shield therewith. This lining 5 is to fit the tire tightly as indicated in Fig. 2 when the tire is inflated and has its side edges beaded or otherwise rolled or thickened as indicated at 6, this beading or roll engages directly under the side edges of the shield, as indicated in Figs. 1 and 2, for the purpose of preventing sand, gravel, or other particles from lodging or otherwise coming between the outer surface of the tire and the shield. By experiment, it has been found that the lining 5 which is of any suitable material, however, preferably of cotton fabric, more effectively excludes the sand and such particles than other means that have been experimented with. It is to be understood, of course, that the shield is to be placed about the pneumatic tire of a wheel when the latter is deflated and when inflated expands to tightly secure the shield thereon. The lining 5 is of a continuous strip of material. As the shield is constructed of a plurality of plates or sections 1, it will be obvious that old or worn sections can be readily removed and new sections applied in their places.

Of course, it will be readily understood that the outer surface of the shield may be provided with suitable projections or means for preventing skidding.

The above clearly describes my invention, however, certain changes in the construction combination and arrangement of parts may be resorted to as fall within the legitimate scope of the appended claim.

What is claimed is:—

A shield for pneumatic tires consisting of an annular metallic channel member adapted to fit over and around the tire, a lining formed from a strip of comparatively soft material adapted to fit over and around the tire between the same and said channel member, the side edges of said lining being enlarged or beaded, to form binding bands that lie in close gripping contact with the edges of the channel member and which serve to hold the lining in place and against transverse movement and furthermore cause said bands to tightly engage the surface of the tire at said edges of the channel member to prevent particles from collecting and lodging between the tire and the shield.

In testimony whereof we affix our signatures in presence of two witnesses.

CHARLES A. HOSKINS.
JOHN L. METIER.

Witnesses:
 JULIEN METIER,
 JAMES HOSKINS.